T. B. MARSHALL.
MACHINE FOR CLARIFYING AND FILTERING LIQUIDS AND FLUID SUBSTANCES.
APPLICATION FILED SEPT. 18, 1907.

955,889.  Patented Apr. 26, 1910.

WITNESSES:
Robt R Ritchel
M. M. Hamilton

INVENTOR
Thomas B Marshall
BY
Hazeltine & Harden
ATTORNEYS.

UNITED STATES PATENT OFFICE.

THOMAS B. MARSHALL, OF POUGHKEEPSIE, NEW YORK, ASSIGNOR TO THE DE LAVAL SEPARATOR COMPANY, A CORPORATION OF NEW JERSEY.

MACHINE FOR CLARIFYING AND FILTERING LIQUIDS AND FLUID SUBSTANCES.

955,889.

Specification of Letters Patent. Patented Apr. 26, 1910.

Application filed September 18, 1907. Serial No. 393,429.

*To all whom it may concern:*

Be it known that I, THOMAS B. MARSHALL, a subject of the King of Great Britain, formerly of Toronto, Canada, residing at Poughkeepsie, county of Dutchess, and State of New York, have invented a new and useful Improvement in Machines for Clarifying and Filtering Liquids and Fluid Substances, of which the following is a full, clear, and exact description, reference being had to the accompanying drawings, which form a part of this specification.

My invention has for its object to clarify and filter liquids and fluid substances, as, for instance, oils and varnishes. Speaking generally, I accomplish this result by providing a primary separation of the heaviest solid material in a compartment devoid of filtering material in which the separation is due alone to the action of centrifugal force, and then leading the partially treated substance to a second compartment provided with means to filter in which the finer solid matter is removed. In the first compartment, if liners are used, a passage is provided between the periphery of the bowl and the outer end of these liners for the collection of the separated solid materials. The second compartment may be provided with a periphery having openings over its surface and a plurality of divisions having staggered openings to cause the liquid to follow a sinuous course in its passage to the periphery. In order to avoid weakening the peripheral wall of the compartment by too large a number of openings, I limit the number of said openings and back up the periphery with a supplemental filter formed of a wire screen backed with filtering material. In this way the filtering surface is equal to the peripheral wall of the bowl without weakening the peripheral wall and the openings therein form outlets. I can also use a number of filtering screens without in this compartment. Practically I use a two-compartment bowl; in one compartment, the heavier particles are separated out by centrifugal force alone, while in the other compartment the action is a dual one of centrifugal action and filtering.

Figure 1:
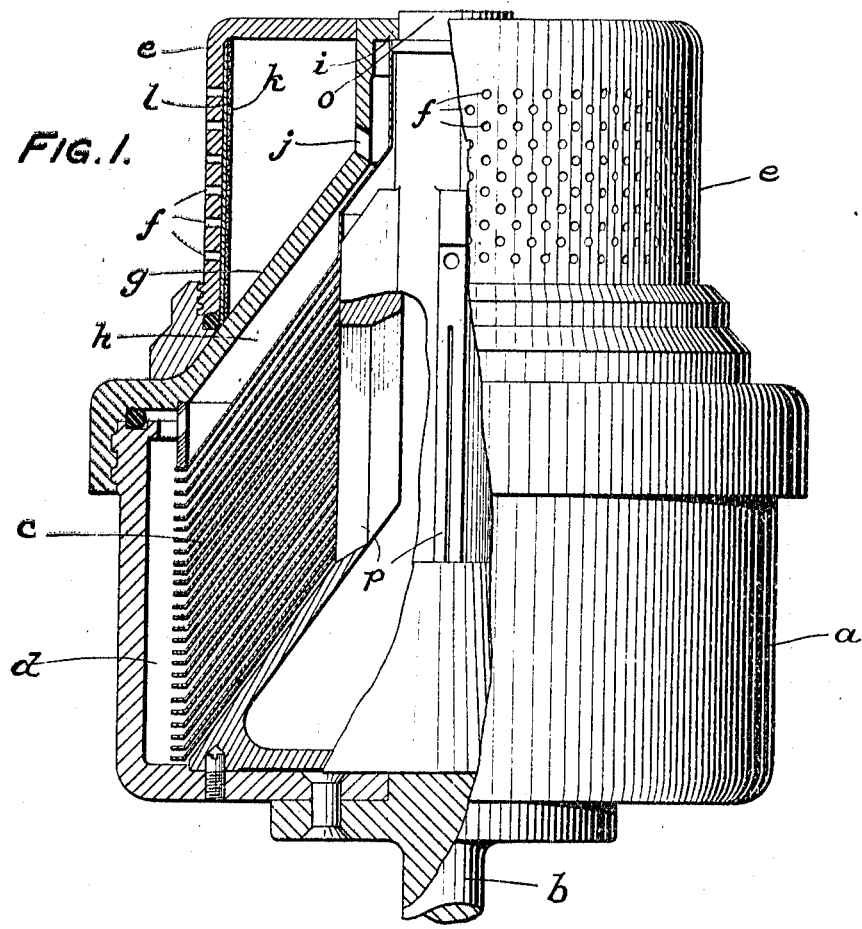
Figure 2:
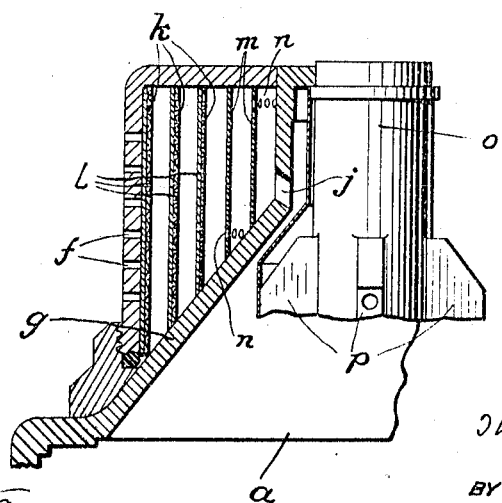

I will now describe my invention as illustrated in the accompanying drawings in which:

Figure 1 is an elevation of a separating bowl, shown partially in section. Fig. 2 is a sectional view showing a portion of a modified form of bowl.

*a* is the primary bowl devoid of a filter.

*b* is the bowl spindle which is revolved in the ordinary and well known manner; *c* are liner plates.

*d* is a passage between the end of the liner plates *c* and the periphery of bowl *a*.

*e* is the second bowl or compartment having orifices *f* in its periphery. This bowl or compartment *e* is secured to bowl *a* so as to rotate in unison therewith, the wall *g* forming the bottom wall of bowl *e* and the neck of bowl *a*. Below the wall *g* and in bowl *a* is the passage *h* closed at the top by flange *i*. Through the wall *g* is the orifice *j* forming the outlet for the liquid from bowl *a*. This outlet leads to bowl *e*. I do not intend to limit myself to the position shown for this outlet *j*. The periphery of bowl *e* is perforated and has a backing composed of a wire screen *k* of fine mesh, against the back of which is placed the filtering material *l* which may be of filtering paper or cloth. If desired, there may be placed in the bowl *e* a plurality of concentric cylinders *m* dividing the bowl *e* into a plurality of chambers, the walls of the cylinders having openings *n* therethrough, said openings being at the top and bottom, alternately, of the cylinders. (See Fig. 2). A plurality of screens *k* and filtering material *l* may also be used in the bowl *e*. (See Fig. 2). I may also in some cases use the screens alone between the periphery and center of the bowl.

The operation is as follows: The liquid to be purified or clarified is entered through the feed tube *o* and distributed between the liners *c* by the orificed wings *p*. Under the action of centrifugal force, the liquid is forced to the periphery. A certain portion of the solid material, the coarser and heavier, collects in the passage *d* while the liquid, carrying with it the lighter solid material, passes to the passage *h* and through the orifice *j* to the interior of the bowl or compartment *e* where the liquid is again subjected to the action of centrifugal force. In this case, however, the liquid is subjected both to the action of centrifugal force and a filtering action by being forced through the filtering material and out through the orifices in the periphery of the bowl, the solid material being caught and held by the filtering material.

Broadly considered, my invention consists in separating the heavier solid constituents in one compartment or bowl and then separating the remaining and lighter solid constituents in a second compartment or bowl, there being an outlet from the first compartment or bowl to the other compartment or bowl. I do not intend to limit myself to the relation of location shown of the two compartments or bowls with respect to each other, or the position shown of the outlet from one bowl or compartment to the other, or to the filtering bowl or compartment having a perforated periphery, unless the same be specifically claimed.

Having now fully described my invention, what I claim and desire to protect by Letter's Patent is:

1. In a machine for clarifying and filtering liquids and fluid substances, in combination, a two compartment rotatable bowl, one compartment being superposed upon the other, one compartment having a solid outer wall, the other a perforated filtering outer wall, an inlet to the compartment having a solid periphery and a fluid connection between the outer portion of said compartment and the inner portion of the compartment having a perforated periphery.

2. In a machine for clarifying and filtering liquids and fluid substances, in combination, a two compartment rotatable bowl, one compartment being superposed upon the other, one compartment having a solid outer wall, the other a perforated filtering outer wall, an inlet to the compartment having a solid periphery and a fluid connection between the outer portion of said compartment and the inner portion of the compartment having a perforated periphery, and filters in said last mentioned compartment between its outer and inner portion.

3. In a machine for clarifying and filtering liquids and fluid substances, in combination, a two compartment rotatable bowl, an inlet to one compartment, and a single outlet from said compartment, said outlet leading to said second compartment.

4. In a machine for clarifying and filtering liquids and fluid substances, in combination, a two compartment rotatable bowl, an inlet to one compartment and a single oulet from said compartment, said outlet leading to said second compartment, the first mentioned compartment having a solid outer wall, and the second mentioned compartment having a perforated filtering outer wall.

5. In a machine for clarifying and filtering liquids and fluid substances, in combination, a rotating compartment having a solid outer wall, a second rotating compartment, walls in said last mentioned compartment concentric with said bowl, there being openings through said walls alternately at top and bottom thereof, there being a discharge outlet from the first compartment leading to the inner portion of the second compartment.

In testimony of which invention, I have hereunto set my hand, at New York, on this 13th day of September, 1907.

THOMAS B. MARSHALL.

Witnesses:
 GEO. R. REMINGTON,
 RALPH STODDARD.